United States Patent
Baumann et al.

(10) Patent No.: US 8,802,767 B2
(45) Date of Patent: Aug. 12, 2014

(54) REDISPERSIBLE POLYMER POWDER FROM POLYOLEFIN DISPERSIONS AND THE USE THEREOF IN CONSTRUCTION APPLICATIONS

(75) Inventors: Robert Baumann, Rueschlikon (CH); Sandra D. Hofmann, Einsiedeln (CH); Hartmut Kuehn, Halle (DE); Margarita Perello, Duebendorf (CH)

(73) Assignee: Dow Global Technologies LLC, Midland, MI (US)

( * ) Notice: Subject to any disclaimer, the term of this patent is extended or adjusted under 35 U.S.C. 154(b) by 73 days.

(21) Appl. No.: 13/555,225

(22) Filed: Jul. 23, 2012

(65) Prior Publication Data

US 2013/0030086 A1 Jan. 31, 2013

Related U.S. Application Data

(60) Provisional application No. 61/512,154, filed on Jul. 27, 2011.

(51) Int. Cl.
*C08L 33/00* (2006.01)
*C04B 24/26* (2006.01)

(52) U.S. Cl.
USPC .............................................. 524/522; 524/5

(58) Field of Classification Search
USPC ....................................................... 524/522
See application file for complete search history.

(56) References Cited

U.S. PATENT DOCUMENTS

| | | | |
|---|---|---|---|
| 5,753,733 A | 5/1998 | Eck et al. | |
| 6,191,235 B1 | 2/2001 | Eck et al. | |
| 6,300,403 B1 | 10/2001 | Mayer et al. | |
| 6,429,239 B1 | 8/2002 | Eck et al. | |
| 7,939,592 B2 | 5/2011 | Weitzel et al. | |
| 8,580,873 B2 | 11/2013 | Hyman et al. | |
| 2003/0164478 A1* | 9/2003 | Fiedler et al. | 252/500 |
| 2004/0019141 A1 | 1/2004 | Bastelberger et al. | |
| 2004/0097645 A1 | 5/2004 | Weitzel et al. | |
| 2005/0100754 A1* | 5/2005 | Moncla et al. | 428/523 |
| 2005/0256252 A1 | 11/2005 | Williams | |
| 2012/0101181 A1 | 4/2012 | Munshi et al. | |

FOREIGN PATENT DOCUMENTS

| | | |
|---|---|---|
| EP | 1008357 A2 | 6/2000 |
| EP | 1420033 A1 | 5/2004 |
| WO | 9520627 A1 | 8/1995 |
| WO | 9916794 A1 | 4/1999 |
| WO | 9919386 A1 | 4/1999 |
| WO | 0216107 A1 | 2/2002 |
| WO | 0231036 A1 | 4/2002 |
| WO | 2005085331 A1 | 9/2005 |
| WO | 2005118684 A1 | 12/2005 |
| WO | 2010027058 A1 | 3/2010 |

* cited by examiner

*Primary Examiner* — Hui Chin
(74) *Attorney, Agent, or Firm* — Andrew E. C. Merriam

(57) ABSTRACT

The present invention provides compositions comprising redispersible polymer powders of polyolefins with carboxyl group containing dispersant polymers and vinyl ester copolymers which may further comprise hydraulic or water curable inorganic cements for various construction applications, such as cement tile adhesives. Methods of making redispersible polymer powders of polyolefins are also provided, including forming an aqueous polyolefin dispersion, such as, for example, by mechanical dispersion, followed by drying to form the redispersible polymer powders.

10 Claims, No Drawings

REDISPERSIBLE POLYMER POWDER FROM POLYOLEFIN DISPERSIONS AND THE USE THEREOF IN CONSTRUCTION APPLICATIONS

The present invention relates to redispersible polymer powders from polyolefins. More specifically, it relates to redispersible polymer powders comprising one or more polyolefin, one or more carboxyl group containing dispersant polymer and one or more vinyl ester copolymer as well as to dry mix compositions containing the same for construction applications, such as cement tile adhesives, self-levelling flooring compositions (SLFC), sealant slurries, grouts, and repair mortars.

Redispersible polymer powders containing vinyl acetate-ethylene (VAE) polymers, acrylics, styrene-butadiene (SB) polymers, vinyl acetate-vinyl versatate (Veova) copolymers are used in cement containing tile adhesives (CTA) to improve the strength properties of those CTA compositions. One disadvantage of existing products is that the latex film in the cement matrix does not contribute to the adhesion strength in the wet stage, such as after water immersion. In such applications, polymer films with improved hydrolytic stability would be desirable to give enhanced film strength in the wet stage because unlike existing redispersible polymer powders they would not lose their strength on water aging.

Another way of improving strength properties of tile adhesives in wet conditions is to add liquid latex to the cement/sand mix. This technology (i.e. for swimming pools) has some disadvantages over one component drymix formulations which contain a redispersible polymer powder, including uncontrolled dosage, additional mixing step, transport of water with product, inconvenience of a 2-component system and the aging and biostability of the liquid latex component.

US patent publication 2003/0164478 to Fiedler et al. discloses vinyl ester copolymer redispersible polymer powders that may comprise copolymers of the vinyl esters with olefins and/or alkyl acrylates and the modification of the redispersible polymer powder with carboxylic esters of polyalcohols to of improve the water resistance and hydrophobicity of polymer powder. The stability of the polymer phase of the redispersible polymer powder in wet conditions, i.e. in the presence of water, however still needs improvement.

The present inventors have endeavored to solve the problem of providing a redispersible polymer powder for use in construction applications wherein the product polymer powder provides water resistance and hydrophobicity and, in addition, is stable in the presence of water and exhibits improved strength after aging in wet conditions.

STATEMENT OF THE INVENTION

In accordance with the present invention, redispersible polymer powder compositions comprise powder particles having one or more polyolefin, from 5 to 50 wt. % of one or more carboxyl group containing dispersant polymer, based on the total amount of polyolefin and dispersant polymer solids, one or more vinyl ester copolymer and one or more colloidal stabilizer, such as, for example, polyvinyl alcohol. The weight ratio of polyolefin to vinyl ester copolymer in the redispersible polymer powder may range from 10:90 to 90:10. Preferably, the redispersible polymer powder further comprises an anti-caking agent, such as, for example, kaolin.

The redispersible polymer powder compositions of the present invention may comprise a dry mix of the redispersible polymer powders with cement, such as, for example, portland cement. The amount of the redispersible polymer powder in the dry mix may range from 0.5 to 20 wt. % or, preferably, from 1 to 10 wt. % or, more preferably, from 1.5 to 5 wt. %, based on the total weight of the dry mix.

The carboxyl group containing dispersant polymer may comprise the copolymerization product of one or more olefin monomer with from 5 to 50 wt. %, or, preferably, 10 wt. % or more, or, more preferably, up to 40 wt. %, based on the total weight of monomers used to make the copolymer of a carboxylic acid, anhydride or salt monomer in copolymerized form. Preferably, the carboxylic acid, anhydride or salt monomer is acrylic or methacrylic acid. More preferably, the carboxyl group containing dispersant polymer is a copolymer of ethylene with acrylic acid or methacrylic acid.

The present invention further provides methods for making the redispersible polymer powder particles and compositions thereof comprising forming an aqueous polyolefin dispersion containing a polyolefin and a carboxyl group containing dispersant polymer, blending the aqueous polyolefin dispersion with a vinyl ester copolymer to form an aqueous polymer dispersion and drying the resulting aqueous polymer dispersion to form a redispersible polymer powder. Forming the aqueous polyolefin dispersion comprises mechanical dispersion, preferably, by extrusion. Mechanical dispersion may comprise shearing and, if desired, heating a polyolefin and the dispersing agent(s), with or without water, to above its melting temperature (Tm) to make a liquid polyolefin and, if needed, diluting the liquid polyolefin with water while shearing the resulting mixture to form an aqueous dispersion, having a volume average particle size of less than 100 μm, for example, 0.3 μm or more, or, 50 μm or less, and from 20 to 75 wt. % of solids.

Unless otherwise indicated, as used herein, the term "volume average particle size" of a polymer dispersion means the volume average particle size distribution as determined in a known manner by Laser Diffraction, for example, by using a Beckman Coulter LS 230 Particle Size Analyzer (Beckman Coulter, Brea, Calif. or a Grimm Microtrac particle size analyzer (Grimm Technologies, Inc., Douglasville, Ga.). As used herein, the term "average particle size of a redispersible polymer powder" means the X50 size of the particle size distribution and represents the median diameter in micrometers, which means that 50% by weight of the particles are smaller than this diameter. The particle size distribution of the redispersible polymer powder was measured by laser diffraction using a particle size analyzer "Sympatec Helos" (Sympatec GmbH, Clausthal-Zellerfeld, DE) at a measuring range of 1.8-350 μm and dispersing the powder by compressed air As used herein, unless otherwise indicated, the measured glass transition temperature (measured $T_g$) is used. As used herein, the term "measured $T_g$" means a $T_g$ that is measured using differential scanning calorimetry or DSC (rate of heating 10° C. per minute, $T_g$ taken at the midpoint of the inflection). As used herein the term "calculated $T_g$" refers to the $T_g$ of a polymer calculated by using the Fox equation (T. G. Fox, Bull. Am. Physics Soc., Volume 1, Issue No. 3, page 123 (1956).

As used herein, the term "redispersible polymer powder" refers to any powder made from a polymer dispersion which when dispersed in water has an average particle size of less than the upper particle size limit in the original dispersion. The term "redispersibility" is defined as the volume fraction of particles that are less than the upper particle size limit in the original dispersion.

The present invention provides redispersible powders from a combination of polyolefin and vinyl ester copolymer for construction applications. Such redispersible polymer powders when used in cement containing tile adhesives (CTAs) have helped to improve the bonding strength of the CTAs after wet ageing compared to redispersible polymer powders made solely from the same vinyl ester copolymer in the same proportion of polymer solids. Such redispersible polymer powders enjoy good hydrolytic stability, especially in the latex film they form within the cement structure. Moreover, the spray-dried powder was easily redispersed in water.

The redispersible polymer powders of the present invention comprise a carboxyl group containing dispersant polymer which enables both the formation of a stable polyolefin dispersion in water and an effective drying step that forms a redispersible polymer powder. The carboxyl group containing dispersant polymer may comprise the polymerization product of any olefin used to make the polyolefin and any ethylenically unsaturated or addition polymerizable carboxyl group, anhydride or salt containing monomer. Suitable carboxyl group, anhydride or salt containing monomers may include, for example, acrylic acid, methacrylic acid, maleic acid, itaconic acid or their anhydrides, preferably acrylic acid. Examples of suitable carboxyl group containing dispersant polymers are polyolefins having maleic anhydride grafted thereon. A preferred carboxyl group containing dispersant polymer is ethylene-acrylic acid copolymer (EAA), such as, for example a copolymer having 80 wt. % ethylene and 20 wt. % acrylic acid, based on the total weight of the copolymer. More preferably, the carboxyl group containing dispersant polymer and the polyolefin comprise the polymerization residue of the same olefin as at least 10 wt. %, preferably, 30 wt. % or more, based on the total weight of the dispersant polymer and the polyolefin, respectively.

The carboxyl group containing dispersant polymer may comprise from 5 to 50 wt. %, based on the total weight of the polymer, of a carboxylic acid, anhydride or salt monomer, preferably, 10 wt. % or more, or, preferably, up to 40 wt. %. An excessive amount of the carboxylic acid, anhydride or salt monomer would cause the dispersant polymer to lack sufficient polarity so that it will not interact or absorb onto a polyolefin particle and form a dispersion. Too little of the carboxylic acid, anhydride or salt monomer would prevent the resulting dispersant polymer from effectively dispersing a polyolefin in water.

Suitable carboxyl group containing dispersant polymers of the present invention may comprise olefin carboxylic acid polymers, or their salts, such as ethylene carboxylic acid copolymers such as, preferably, ethylene acrylic acid copolymers or ethylene methacrylic acid copolymers; copolymers of olefins with alkyl ether carboxylates; or sulfonated polyolefins. Suitable amounts of the carboxyl group containing dispersant polymer may range from 5 to 50 wt. %, based on the total amount of polyolefin and dispersant polymer solids, preferably, 10 to 40 wt. %, or, more preferably, 30 wt. % or less. For stability, an aqueous polyolefin dispersion should have at least 5 wt. % of a carboxyl group containing dispersant polymer, based on the total amount of polyolefin and dispersant polymer solids. Below 10 wt. %, the phase inversion into water of a polyolefin melt or solvent solution may be compromised, fines may settle out from the dispersion, or a less uniform particle size distribution may result. Suitable polyolefins for use in the present invention may include polymers and copolymers of $C_2$ to $C_{20}$ α-olefins, including elastomers. Suitable α-olefins for making the polyolefins may be such as, for example, ethylene, propylene, 1-butene, 3-methyl-1-butane, 4-methyl-1-pentene, 3-methyl-1-pentene, 1-heptene, 1-hexene, 1-octene, 1-decene, 1-dodecene and 1-octadecene such as, for example, polyethylene, polypropylene, poly-1-butene, poly-3-methyl-1-butene, poly-3-methyl-1-pentene, poly-4-methyl-1-pentene; copolymers, including elastomers, of ethylene and at least one $C_3$ to $C_{20}$ alpha-olefin, $C_2$ to $C_{20}$ acetylenically unsaturated monomer, and/or a $C_4$ to $C_{18}$ diolefin such as, for example ethylene-propylene copolymer, ethylene-1-butane copolymer, and propylene-1-butene copolymer, copolymers of an alpha-olefin with a conjugated or non-conjugated diene such as, for example, ethylene-butadiene copolymer and ethylene-ethylidene norbornene copolymer, ethylene-propylene-butadiene copolymer, ethylene-propylene-dicyclopentadiene copolymer, ethylene-propylene-1,5-hexadiene copolymer, and ethylene-propylene ethylidene norbornene copolymer. Preferred polyolefins are homopolymers and copolymers of ethylene, propylene, isobutylene, 1-butene, 1-hexene, 4-methyl-1-pentene, 1-hexene and 1-octene. More preferred polyolefins are polyethylene, polypropylene and polyethylene-co-octene.

The vinyl ester copolymers suitable for use in the present invention may comprise any copolymer of any vinyl ester, such as a vinyl ester of a 1 to 18C, optionally branched, alkane-carboxylic acid with any of (meth)acrylate ester of a 1 to 15C, optionally branched, alcohol, dienes, olefins, vinyl-aromatics and vinyl halides. The $T_g$ of the vinyl ester copolymer may range from 50° C. or below and –20° C. or more. Preferred vinyl ester copolymers comprise from 2 to 30 wt. %, based on the total weight of the copolymer of the polymerization residue of one or more olefin, such as ethylene or propylene. Preferably, at least one of the olefin monomers used to make the vinyl ester copolymer is the same as at least one of the olefin monomers used to make the polyolefin polymer in the present invention. One preferred vinyl ester copolymer is vinyl acetate ethylene copolymer.

To achieve improved wet ageing, suitable ratios of vinyl ester copolymers to polyolefins in the present invention may range, based on solids, from 10:90 to 90:10, or, preferably, from 30:70 to 70:30, or, more preferably, from 45:55 to 55:45.

Preferably, the redispersible polymer powders of the present invention comprise an anti-caking agent. Examples of anticaking agents include but are not limited to kaolin, calcium carbonate, magnesium carbonate, talc, gypsum, silica and silicates, and mixtures thereof. The particle sizes of the anticaking agents are preferably in the range of from 100 nm to 10 μm. The anticaking agent is preferably of mineral origin. A preferred anticaking agent is kaolin. It is preferably added in an amount of from 0.5 wt. % up to 40 wt. %, based on the total weight of polymeric constituents present in the drying step, more preferably, 5 wt. % or more.

Methods to form the redispersible polymer powders of the present invention comprise forming an aqueous polyolefin dispersion having the carboxyl group containing dispersant polymer and the polyolefin in the proportions of the present invention, preferably, without the use of solvents, combining the polyolefin dispersion with the vinyl ester copolymer and a colloidal stabilizer, and drying to form the redispersible polymer powder.

Suitable polyolefin dispersions may comprise the polyolefin homopolymers and copolymers described above.

Forming aqueous polyolefin dispersions used to make the redispersible polymer powders of the present invention may comprise conventional mechanical dispersion of the polyolefin in the presence of a carboxyl group containing dispersant polymer and, if desired, a base, such as an alkali metal hydroxide either in solid or aqueous solution form. Suitable mechanical dispersion methods may include shearing and, if desired, heating a polyolefin and the dispersing agent(s), with or without water, above the melting temperature (Tm) of the polyolefin or at a temperature that with shearing will heat the polyolefin to melt it, to make a liquid polyolefin and, if needed, diluting the liquid polyolefin with water while shearing the resulting mixture to form an aqueous dispersion, having a weight average particle size of less than 100 μm, for example, 0.3 μm or more, or from 0.5 to 5 μm.

Suitable shearing methods include extrusion and melt kneading in a known manner including, for example, in a kneader, a Banbury mixer, single-screw extruder, or a multi-screw. The melt kneading may be conducted under the conditions which are typically used for melt kneading a polyolefin. A preferred melt-kneading machine is, for example, a multi screw extruder having two or more screws, to which a kneading block can be added at any position of the screws. If desired, an extruder may be provided with a first material-supplying inlet, such as for adding water or base solution, a second material-supplying inlet, such as for the carboxyl group containing dispersant polymer and further third and forth material-supplying inlets in this order from the upstream to the downstream along the flow direction of a material to be kneaded. Further, a vacuum vent may be added. In an example, the dispersion is first diluted to contain about 1 to about 3% by weight of water and then subsequently further diluted to comprise greater than 25% by weight of water. The further dilution may provide a dispersion with at least about 30% by weight of water.

Exemplary methods for preparing stable aqueous polyolefin dispersions are also disclosed in, for example, U.S. Pat. Nos. 3,360,599, 3,503,917, 4,123,403, 5,037,864, 5,539,021, and WO 2005085331A. Melt kneading methods are disclosed, for example, in U.S. Pat. Nos. 5,756,659 and 6,455,636.

Preferably, the aqueous polyolefin dispersion is formed in the absence of any organic solvent.

In diluting liquid polyolefins, one may first dilute them so as to contain 1 to 3% by weight of water and then subsequently further dilute them to comprise greater than 25% by weight of water. Preferably, the further dilution provides a dispersion with at least about 30% by weight of water.

Any high shear or melt kneading apparatus known in the art may be used under conditions which are typically used for melt kneading and so is not particularly limited.

Suitable apparati may include a kneader, a Banbury mixer, an extruder, preferably, a twin screw extruder, or other apparati for generating high shear, such as a homogenizer, e.g. Gifford-Woods. For example, polyolefin, water and dispersant can be emulsified using a homogenizer by mixing at nominally 10,000 rpm (3,000 to 20,000 rpm) for 10 minutes (5 to 60 minutes) in the presence of a small amount of defoamer, while flashing off any solvent (preferably not used) by rotary evaporation at 80° C.

An extruder may be provided with a first material-supplying inlet and a second material-supplying inlet, and further third and forth material-supplying inlets in this order from upstream to downstream along the flow direction of a material to be kneaded. Further, if desired, a vacuum vent may be added at an optional position of the extruder.

In an example of extrusion to form a mechanical dispersion, an aqueous solution of carboxyl group containing dispersant polymer may be delivered to the initial water (IA) injector of an extruder, such as a Berstorff extruder. The polyolefin may be fed to the extruder using a loss-in-weight feeder. The melt zone of the extruder may be maintained below the softening temperature of the polyolefin to prevent it from caking at the bottom of the feed throat and the melt seal from rupturing. The barrel temperatures may be set substantially above the $T_g$ of the polyolefin, e.g. they may be all initially set to 100° C., or up to 200° C., and subsequently reduced. For example, a melt zone temperature of 60° C., an emulsification zone of 90° C. and a dilution zone of 80° C. may be employed to produce the smallest amount of grit.

Preferably, the mechanical dispersion equipment may comprise a pressurized high shear device such as a PARR reactor (manufactured by The Parr Instrument Company, Moline, Ill.) with high shear mixing blades e.g. Cowles blades, a modified extruder system, or rotor stator device. For example, a PARR stainless steel pressure reactor with a Cowles blade, or stirrer blade with serrated teeth, equipped with an optional pulley system to allow mixer speeds of up to 1830 rpm, or more; heating and cooling devices may also be employed to make the aqueous polyolefin dispersions. In a preferred mechanical dispersion process, the reactor may be sealed and heated to heat the polyolefin above its Tm and produce a liquid; it may be heated, for example to 60° C. or more, and up to 200° C., so as to induce shear and bring the temperature of the polyolefin above its Tm. After reaching the temperature the mixture may be stirred for a sufficient amount of time, e.g. 2 to 30 minutes, to allow sufficient mixing of the polyolefin and the carboxyl group containing dispersant polymer. To this mixture water may be added using a HPLC pump, to obtain a substantially homogeneous mixture. Water addition may be continued while cooling the reactor by air and water, down to a temperature of, for example 50° C., with stirring being maintained during the cooling process, to obtain a substantially homogeneous dispersion. The resultant aqueous dispersion may be collected by filtration through a 190 μm filter.

Suitable polyolefin dispersions for forming the redispersible polymer powders of the present invention may have a percent solids of from 5% to 75% by volume and a pH of less than 12, such as, for example 5 or more. The pH can be adjusted either in-situ by adding alkali to a mixture of polyolefin and the dispersant polymer, or by converting the carboxyl group containing dispersant polymer to its salt form before adding it to the polyolefin and forming the dispersion.

Vinyl ester copolymers are combined with the polyolefin dispersion of the present invention in any known manner, such as simple mixing or combining in with the polyolefin dispersion after it is formed in the apparatus used to make the polyolefin dispersion Drying the aqueous dispersion to prepare the redispersible polymer powder of the present invention may comprise, for example, spray drying, freeze drying or fluidized-bed drying. Preferably the aqueous dispersion is spray dried. The solids content of the dispersion to be spray-dried may generally be from 25 to 65 wt. %, for example, from 35 to 55 wt. %, preferably from 40 to 50 wt. %, based on the total weight of the dispersion.

Spray drying can take place in conventional spray drying systems, for example a dispersion may be atomized by using single, two-fluid or multi-fluid nozzles or via a rotating disk in a stream of drying gas which may be heated. In general, air, nitrogen or nitrogen enriched air is employed as the drying gas, the inlet temperature of the drying gas is 45° C. or more and does not exceed 200° C., preferably 100° C. to 180° C., more preferably from 130 to 170° C. The product outlet temperature may generally be from 30° C. to 90° C., preferably from 40° C. to 70° C., depending on the plant, the $T_g$ of the polymeric composition, and the desired degree of drying.

As a carboxyl group containing dispersant polymer is already included during the dispersion process, for example during the mechanical dispersion, it may not be necessary to add additional colloidal stabilizer to the dispersion for spray drying. However, to prevent blocking of the redispersible polymer powder on storage, spray drying is preferably performed after addition of one or more additional colloidal stabilizers during the dispersion process as a spraying aid to the dispersion. Any additional colloidal stabilizer added to the dispersion for spray drying is preferably added in the form of an aqueous solution.

Suitable spraying aids or colloidal stabilizers may include polyinyl alcohols, such as, for example, partially hydrolyzed polyvinyl acetates; polyvinylpyrrolidones; polysaccharides in water-soluble form, e.g., starches (amylose and amylopectin), celluloses and their carboxymethyl, methyl, hydroxyethyl, hydroxypropyl derivatives; proteins such as casein or caseinate, soy protein, gelatin; ligninsulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers. Polyvinyl alcohols are the preferred colloidal stabilizers and spraying aids.

In general, the total amount of spraying aid or colloidal stabilizer in the redispersible polymer powder is from 0.01 to 30 wt. %, based on the total polymer in the dispersion including the carboxyl group containing dispersant polymer. Preferably, the total amount of colloidal stabilizer prior to the drying step is 3 wt. % or more, or, 10 wt. % or more, or up to 20 wt. %, based on the total polymer in the dispersion. The amount of colloidal stabilizer may be reduced as a lower proportion of vinyl ester copolymer and, relatively, a greater amount of polyolefin dispersion is included in the drying operation.

Additives may be included before drying the polymer dispersion to form the redispersible polymer powder in any manner as long as a homogenous dispersion mixture is obtained. Further, additives such as surfactants and defoamers, and fillers may be employed, if desired, and, preferably added in conventional amounts to the aqueous dispersion before drying. For example, an antifoamer may be employed in an amount of up to 1.5 wt. %, based on the weight of the polyolefin and vinyl ester copolymer particles in the aqueous dispersion. Conventional superplasticizers may be employed in an amount of at least 0.01 wt. %, preferably from 5 to 15 wt. %, based upon the weight of the water redispersible polymer powder (RDP).

An anticaking agent (antiblocking agent) may be added to the polymer powder during and/or immediately after drying to increase storage stability, for example in order to prevent caking and blocking and/or to improve the flow properties of the powder. This addition is preferably carried out as long as the powder is still finely dispersed, for example still suspended in the drying fluid or gas.

The produced redispersible polymer powder preferably has an average (X50) particle size diameter of from 5 to 100 micrometers, preferably from 20 to 90 micrometers, most preferably from 50 to 80 micrometers. The X50 size of the particle size distribution of the redispersible powder depends on drying conditions and drying equipment.

The redispersible polymer powders (RDP) of the present invention may be used in a variety of construction applications, such as, for example cement containing tile adhesives (CTA), basecoats for exterior insulation finishing systems (EIFS) waterproofing membranes, grouts, sealant slurries, and repair mortars. RDP products with enhanced hydrolytical stability can also be used in other construction applications where hydrolytical stability is desired, i.e. one component sealants and tile grouts, self leveling flooring compounds (SLFC).

EXAMPLES

The following examples are provided for illustrative purposes only and are not intended to limit the scope of the claims that follow. Unless otherwise indicated, all parts and percentages are by weight and all temperatures are in ° C.

The following materials were used in making the redispersible polymer powders of the present invention:

Polyolefin 1: A copolymer of 8 wt % ethylene and 92 wt % propylene, based on the weight of the copolymer having a density 0.876 g/cm3, $T_g$ of −25° C. and a Tm of 60° C.

Polyolefin 2: An elastomeric copolymer of 38 wt. % octene and 62 wt. % ethylene, based on the weight of the copolymer having a density 0.87 g/cm3 and $T_g$ of −56° C. and a Tm of 60° C.

Polyolefin 3: A copolymer of 31 wt. % octene and 69 wt % ethylene, based on the weight of the copolymer, having a density 0.885 g/cm3 and Tg of −51° C. and a Tm of 78° C.

Carboxyl group containing dispersant polymer 1: A copolymer of 80 wt. % ethylene and 20 wt. % acrylic acid, based on the weight of the copolymer, with an acid number of 155 mg KOH/g polymer, a melt index of 300 g/10 min at 190° C. and a melting point of 77° C.

Neutralizing Base: aqueous potassium hydroxide, 45% w/w.

Vinyl ester copolymer: A copolymer of 91 wt. % vinyl acetate and 9 wt. % ethylene, based on the weight of the copolymer having a $T_g$ of 17° C.

Vinyl ester copolymer powder: A redispersible polymer powder of the Vinyl ester copolymer and containing the Colloidal stabilizer in the amount of 10%, based on the total weight of polymer in the powder, and 12%, based on the total weight of polymer in the powder, of kaolin as the Anti caking agent.

Sand: quartz sand (grain size distribution 0.1-0.3 mm)

Cement: Portland Cement CEM 142.5: Pure Portland cement having a strength of 42.5 MPa of a concrete made with this cement after 28 days of ageing according to ASTM C150.

Colloidal stabilizer: Polyvinyl alcohol having an 88% degree of hydrolysis of polyvinyl acetate.

Anti caking agent: Kaolin clay KaMin™ 90 (KaMin LLC, Macon, Ga.), Median particle size (Malvern LLS): 1.5 μm.

Cellulose Ether: Hydroxypropyl methyl cellulose containing 20% hydroxypropyl starch.

Preparation of the Polyolefin Dispersions:

The Polyolefin Dispersions 1-4 were prepared utilizing a Berstorff ZE25 extruder (48 L/D rotating at 500 rpm) according to the following procedure with the formulation components for each aqueous dispersion being reported in Table I, below.

The polyolefin polymer and the carboxyl group containing dispersant polymer were supplied to the feed throat of the extruder via a Schenck Mechatron loss-in-weight feeder. The base polymer, and the carboxyl group containing dispersant polymer were melted blended, and then emulsified in the presence of water, and optionally a neutralizing agent such as KOH. The emulsion phase was then conveyed forward to the dilution and cooling zone of the extruder where additional water was added to form the aqueous dispersions having solid level contents in the range of from less than 60 weight percent. The properties of each of the dispersion components were measured, and are reported in Table II. Additional water was added as the emulsion phase was conveyed down the length of the extruder where it was combined with more water to dilute it down to final solid levels of less than 60 weight percent. The base (if present), initial water, and dilution water were all supplied by Isco dual syringe pumps (500 ml). The barrel temperature of the extruder was set to 150° C. After the dispersion exited the extruder, it was further cooled and filtered via a 200 μm mesh size bag filter.

TABLE I

| Dispersion | Ratio Polymer/ Dispersant | Neutralizing base | Volume Mean (μm) | Viscosity (RV3, 50 RPM) (cP) | pH | solids (wt %) |
|---|---|---|---|---|---|---|
| 1 | 70/30 | KOH | 1.5 | <77 | 10.0 | 40.2 |
| 2 | 70/30 | KOH | 1.48 | 338 | 10.5 | 41.0 |
| 3 | 85/15 | KOH | 0.87 | 104 | 10.1 | 45.8 |
| 4 | 70/30 | KOH | 0.63 | 334 | 10.6 | 44.0 |

Dispersion 1: A mixture of 70 wt. % of solids of Polyolefin 1, and 30 wt. % of Carboxyl group containing dispersant polymer 1.
Dispersion 2: A mixture of 70 wt. % of solids of Polyolefin 2 and 30 wt. % of Carboxyl group containing dispersant polymer 1.
Dispersion 3: A mixture of 85 wt. % of solids of Polyolefin 2 and 15 wt. % of Carboxyl group containing dispersant polymer.
Dispersion 4: A mixture of 70 wt. % of solids of Polyolefin 3 and 30 wt. % of Carboxyl group containing dispersant polymer 1.

To form redispersible polymer powders, spray drying of mixtures comprising the polyolefin dispersions or other polymer dispersions as given in Table 2, below, was done in a lab scale Niro mobile spray dryer (GEA Niro, Soeberg, Denmark) equipped with a 2 component nozzle with an inlet temperature of 130° C. and an outlet temperature of 50° C. Colloidal stabilizers were added to dispersions before drying; and anticaking agents were added into the dryer during drying process by a two-component jet.

TABLE 2

Formulations Dried To Make Redispersible Polymer Powders

| Ingredient | 1 | 2** | 3 | 4 | 5 | 6 | 7 | 8 | 9 | 10 | 11 |
|---|---|---|---|---|---|---|---|---|---|---|---|
| Dispersion 1 | 3.55 | | | | | | | | | | |
| Liquid of Dispersion 1 | | 8.75 | | | | | | | | | |
| Dispersion 1 and Vinyl ester copolymer powder (50:50) | | | 3.75 | | | | | | | | |
| Dispersion 2* | | | | | | | 2.00 | | | | |
| Dispersion 3* | | | | | 2.00 | | | | | | |
| Dispersion 3* and Vinyl ester copolymer powder (50:50) | | | | | | 2.00 | | | | | |
| Dispersion 2* and Vinyl ester copolymer powder (50:50) | | | | | | | | 2.00 | | | |
| Dispersion 4* | | | | | | | | | 2.00 | | |
| Dispersion 4* and Vinyl ester copolymer powder (50:50) | | | | | | | | | | 2.00 | |
| Vinyl ester copolymer powder | | | | 4.00 | | | | | | | 2.00 |

**not spray dried - used as liquid (40.6% solids);

*Includes Anti caking agent 10 wt. % and Colloidal stabilizer 12 wt. %, based on the total weight of polymer in the redispersible polymer powder.

To make cement containing tile adhesives, the redispersible polymer powders of Table 2, above, were formulated into cements as set forth in Table 3, below, with a Hobart mixer as described in EN 196, part 1 (1999). The fresh plaster is prepared in a Hobart mixer. An amount of 2 kg of dry powder is weighed into a plastic cup. The required amount of water is put into the Hobart bowl. The powder is added and the material mixed at speed 1 for 30 sec. The Hobart is then stopped for 60 sec. During this time there is some manual scraping from the wall and the bottom of the bowl in order to mix dry material which was not reached by the stirrer. The mixer is then started again at speed 1 for another 60 sec. Afterwards the adhesive is allowed to mature in the mixing bowl for 10 minutes. Finally, the mortar is mixed for another 15 sec. at speed 1. Then the fresh adhesive is ready for testing.

TABLE 3

Cement Tile Adhesive Formulations

| Ingredient | 1 | 2** | 3 | 4 | 5 | 6 | 7 | 8 | 9 | 10 | 11 |
|---|---|---|---|---|---|---|---|---|---|---|---|
| Redispersible Polymer Powder | 3.55 | 8.75 | 3.75 | 4.00 | 2.00 | 2.00 | 2.00 | 2.00 | 2.00 | 2.00 | 2.00 |
| Cement | 40.00 | 40.00 | 40.00 | 40.00 | 40.00 | 40.00 | 40.00 | 40.00 | 40.00 | 40.00 | 40.00 |
| Sand | 60.00 | 60.00 | 60.00 | 60.00 | 60.00 | 60.00 | 60.00 | 60.00 | 60.00 | 60.00 | 60.00 |
| Cellulose Ether | 0.40 | 0.40 | 0.40 | 0.40 | 0.40 | 0.40 | 0.40 | 0.40 | 0.40 | 0.40 | 0.40 |
| Water | 24.0 | 24.0 | 24.0 | 24.0 | 24.0 | 24.0 | 24.0 | 24.0 | 24.0 | 24.0 | 24.0 |

**Liquid only (40.6% solids)

The cement tile adhesives were tested in the following manner and the data presented in Table 4, below.

Initial Bonding Strength (BS): Was measured according to EN 1348 (1999) and results were presented in N/mm$^2$ BS after water immersion: Bonding strength was measured according to EN 1348.

BS after heat aging: Bonding strength was measured according to EN 1348

BS after 20 minute open time: Bonding strength was measured according to EN 1346 (1999).

Sliding 200 g: Sliding of the adhesive was measured according to EN 1308 (1999).

TABLE 4

Test Results for Cement Tile Adhesives

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Initial Bonding Strength (BS) (N/mm2) | 0.76 | 0.86 | 1.44 | 2.00 | 1.37 | 1.46 | 0.98 | 1.36 | 1.21 | 1.30 | 1.29 |
| BS after water immersion (N/mm2) | 1.32 | 1.06 | 1.35 | 1.25 | 1.25 | 1.19 | 1.09 | 1.15 | 1.06 | 1.18 | 1.16 |
| BS after heat aging (N/mm2) | 0.70 | 0.76 | 1.91 | 2.43 | — | — | — | — | — | — | — |
| BS after 20' open time (N/mm2) | 0.40 | 0.08 | 0.93 | 1.12 | — | — | — | — | — | — | — |
| Sliding 200 g (mm) | 1.01 | 0.12 | 1.24 | 2.50 | 0.14 | 0.32 | 0.25 | 0.42 | 0.19 | 0.62 | 0.87 |

As shown in Table 4, above, the redispersible polymer powders having the inventive combination of polyolefin and vinyl ester copolymer gave a good resistance to water aging and much improved initial bonding strength in comparison to the same polyolefin alone. Compare Example 3 to Examples 1 and 2, Example 6 to 5, Example 8 to Example 7, and Example 10 to Example 9. The initial bonding strength of inventive Examples 6, 8 and 10 was surprisingly good even with only 2 wt. % of polymer in the mortar. Inventive Example 3 gave better water immersion strength in comparison to the comparative vinyl ester copolymer in Example 4; this was so even though less polymer was used in Example 3 than in Example 4. In addition, the inventive redispersible polymer powder of Example 3 gave good initial strength and good strength after heat aging even without an anticaking agent or added carboxyl group containing dispersant polymer.

We claim:

1. A composition comprising redispersible polymer powder particles having one or more polyolefin, from 5 to 50 wt. % of one or more carboxyl group containing dispersant polymer, based on the total amount of polyolefin and dispersant polymer solids, and one or more vinyl ester copolymer in a weight ratio of polyolefin to vinyl ester copolymer of from 10:90 to 90:10.

2. The composition as claimed in claim 1, wherein the carboxyl group containing dispersant polymer comprises the copolymerization product of one or more olefin monomer with from 5 to 50 wt. %, based on the total weight of monomers used to make the copolymer, of a carboxylic acid, anhydride or salt monomer in copolymerized form.

3. The composition as claimed in claim 2, wherein the carboxylic acid, anhydride or salt monomer is acrylic or methacrylic acid.

4. The composition as claimed in claim 2, wherein at least one of the olefin monomer used to make the carboxyl group containing dispersant polymer is the same as at least one olefin monomer used to make the polyolefin.

5. The composition as claimed in claim 1, further comprising one or more colloidal stabilizer.

6. The composition as claimed in claim 5, wherein the colloidal stabilizer is a polyvinyl alcohol.

7. The composition as claimed in claim 1, further comprising an anti-caking agent.

8. The composition as claimed in claim 1 which is a dry mix further comprising cement.

9. The composition as claimed in claim 8, wherein the amount of the redispersible polymer powder in the dry mix ranges from 0.5 to 20 wt. %, based on the total weight of the dry mix.

10. A method for making redispersible polymer powder particles comprising:
    forming an aqueous polyolefin dispersion containing a polyolefin and a carboxyl group containing dispersant polymer,
    blending the aqueous polyolefin dispersion with a vinyl ester copolymer to form an aqueous polymer dispersion,
    and drying the resulting aqueous polymer dispersion to form a redispersible polymer powder.

* * * * *